United States Patent [19]

Raguin et al.

[11] 4,118,773
[45] Oct. 3, 1978

[54] MICROPROGRAM MEMORY BANK ADDRESSING SYSTEM

[75] Inventors: Michel M. Raguin, Medford; Thomas F. Joyce, Burlington, both of Mass.

[73] Assignee: Honeywell Information Systems Inc., Waltham, Mass.

[21] Appl. No.: 783,532

[22] Filed: Apr. 1, 1977

[51] Int. Cl.² .................... G06F 9/12; G06F 13/00
[52] U.S. Cl. .................................................. 364/200
[58] Field of Search ... 364/200 MS File, 900 MS File; 340/173 SP, 173 R

[56] References Cited

U.S. PATENT DOCUMENTS

| | | | |
|---|---|---|---|
| 3,380,025 | 4/1968 | Ragland | 364/200 |
| 3,634,883 | 1/1972 | Kreidermacher | 364/200 |
| 3,659,275 | 4/1972 | Marshall | 364/200 |
| 3,691,538 | 9/1972 | Haney et al. | 340/173 SP |
| 3,829,846 | 8/1974 | Berg et al. | 340/173 SP X |
| 3,872,447 | 3/1975 | Tessera et al. | 364/200 |
| 3,875,564 | 4/1975 | Thuruoka et al. | 364/900 |
| 3,932,844 | 1/1976 | Yokoo | 364/900 |
| 4,028,678 | 6/1977 | Moran | 364/900 |
| 4,040,029 | 8/1977 | Young | 364/900 |

Primary Examiner—Melvin B. Chapnick
Attorney, Agent, or Firm—Nicholas Prasinos; Ronald T. Reiling

[57] ABSTRACT

An apparatus for increasing the capacity and speed of access of a large microprogram read only memory. The apparatus incorporates the use of a four bit control field in a microinstruction word which is set into a hardware register to extend the address beyond the normal range of the addressing capability of the microinstruction word. The four bits stored in the hardward register allow one of a maximum of sixteen read only memory banks to be selected. The word in the selected bank is selected by the normal range addressing capability of the microinstruction words. This technique also allows the selection of another of the read only memory banks in one machine cycle.

7 Claims, 6 Drawing Figures

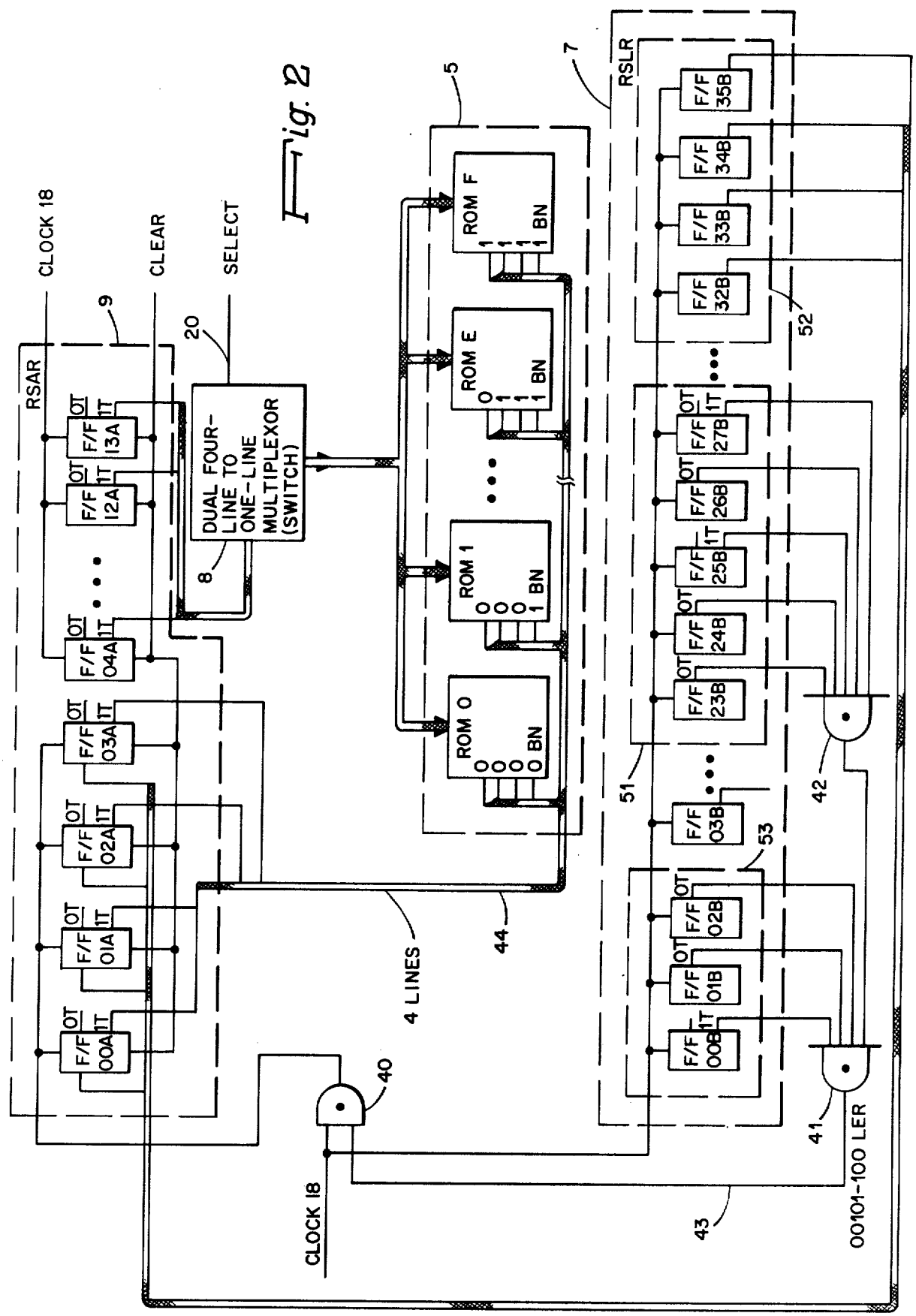

| BIT POS. | 0 | 2 3 | 4 | 10 11 | 17 18 | 21 | 23 25 | 35 |
|---|---|---|---|---|---|---|---|---|
| BCL | 000 | S | REGISTER FILE | | ARITH | B SEL | D | IC | BUS COMM. |
| | | | A | B | TYPE | FUNCT | | | | |

| | 0 | 2 3 | 4 | 10 11 | 17 18 | 21 22 | 23 | 27 28 | 32 35 |
|---|---|---|---|---|---|---|---|---|---|
| LER | 100 | S | REGISTER FILE | | ARITH | B SEL | D | EXT. REG. CONTROL | | |
| | | | A | B | TYPE | FUNCT | | | REG 00101 | CONSTANT 0000XXXX |

53 · 51 · 52

| | 0 | 2 3 | 4 | 10 11 | 17 18 | 21 | 23 26 | 35 |
|---|---|---|---|---|---|---|---|---|
| ULB | 001 | S | REGISTER FILE | | ARITH | B SEL | D | IC | BRANCH ADDRESS |
| | | | A | B | TYPE | FUNCT | | | | 50 |

RSAR 9

- SELECTS 1 OF 256 WORDS PER PAGE
- SELECTS 1 OF 4 PAGES PER ROM (256 WORDS/PAGE)
- SELECTS 1 OF 16 ROMS OF 1024 WORDS EACH (36 BITS/WORD)

MICROPROGRAM MEMORY BANK ADDRESSING SYSTEM

RELATED APPLICATIONS

The following applications are incorporated by reference into the instant application.

1. "Microprogram Splatter Return Apparatus" invented by Thomas F. Joyce and Michel M. Raguin, filed on Oct. 4, 1976 and having U.S. Ser. No. 729,065 and assigned to the same assignee as the instant invention.

2. "Microword Address Branching Bit Arrangement" invented by Thomas F. Joyce and Michel M. Raguin, filed on Oct. 18, 1976 and having U.S. Ser. No. 733,558 and assigned to the same assignee as the instant invention.

BACKGROUND OF THE INVENTION

1. Field of the Invention

This invention relates to data processing systems and more particularly to an improved microprogram control unit.

2. Description of the Prior Art

In the early 1950's, M. V. Wilkes delivered at the Manchester University Computer Inaugural Conference, July, 1951, a paper entitled "The Best Way to Design an Automatic Calculating Machine", in which he proposed, on pages 16-18, a computer which would have a variable-instruction set. Normally a fixed set of instructions is available to the programmer, each one composed of a succession of elementary operations or micro-operations. The implementation of micro-operations constitutes the design of the variable-instruction machine. For each instruction, the micro-operation sequence ($\mu$-op) is usually fixed in computer hardware design. What Wilkes proposed was a means by which a programmer could assemble $\mu$-ops into any instruction the computer was inherently capable of executing. With microprogramming, a machine's instruction repertoire could be altered from day-to-day as its applications vary.

As a means for implementing a variable-instruction repertoire, the need for a memory to store the $\mu$-op sequences was postulated, and Wilkes proposed the use of a diode matrix. In today's technology, we refer to this device as a read-only memory (ROM) or read-only store (ROS) or non-destructive read-out memory. The latter term is more appropriate since the variable instruction repertoire presupposes the ability to change the memory's contents; however, the former terms are in common usage, so we will use them interchangeably. In any event, we are referring to a memory which can be altered by a microprogrammer, but (usually) not by the machine, (i.e. the microwords are permanently recorded in the ROM by having each bit "burned in" by a shorting technique which connects ROM elements in a way desired by the microprogrammer).

The device that performs the $\mu$-op sequencing in a computer is usually referred to as the microprogram control unit. In talking about the ROM system in the microprogram control unit, we will be referring to a plurality of rectangular memory arrays with a specific number of words in each rectangular memory, each work consisting of a predetermined number of bits. All bits of a word are read out together and they cumulatively specify a set of $\mu$-ops to be executed either simultaneously or sequentially as specified by an external clock. Thereafter, another word is read out and executed in similar fashion and so on. Each word specifies a set of $\mu$-ops; and a sequence of words specifies a sequence of sets of $\mu$-ops. A set of words whose $\mu$-ops define (or execute) some specified function is called a microprogram. In today's technology, a variety of devices are being used to create a ROM system; however, semi-conductor devices are fast replacing all other types.

In its most simple usage, each bit of a microword is used to generate one $\mu$-op; hence, a bit position in the word will contain a one as the corresponding $\mu$-op is desired in that word, otherwise it will be zero. These microwords are stored in the read-only memory system. An instruction read out of main memory initiates the first of a series of microwords to be read out of the ROM to cause the CPU of the computer system to execute the instruction read out from main memory.

These techniques are well known and described fully in a book entitled "Microprogramming: Principles and Practices", by Samir S. Husson, published in 1970 by Prentice-Hall Inc., of Englewood Cliffs, N.J. Additionally, several patents have issued on various features of microprogramming including a U.S. Pat. No. 3,736,567 issued on May 29, 1973 which features a technique wherein a predetermined bit in the last microword of a microprogram initiates a new program memory cycle and a new microprogram memory cycle.

Microprogram control units having read only memories are in extensive use today in most computer systems, some typical ones being the Honeywell Model 4200/8200, the Honeywell Series 60, the IBM 360 Series and the IBM 370 Series.

More recently, the microprogram control unit has been incorporated into minicomputers for controlling the execution of instructions. However, the minicomputer business is very competitive in terms of price and performance. Two primary demands compatible with the lowest cost have surfaced on the marketplace. One is to provide a greater "throughput capability", while another is to provide a broader capability for providing a broader spectrum of services to the user. These requirements translate into one broad general requirement — maximum data handling capability with minimum hardware requirements. Accordingly, the computer designer is faced with the problem of reducing the ultimate cost of the computer system while at the same time increasing capabilities of the computer system. These requirements act in opposition to each other. Generally, additional features and capabilities require increased hardware which translates to increased cost; whereas reducing costs translates to a reduced number of features and capabilities by reducing hardware.

Although microprogram control units with ROM systems have been introduced into minicomputers for controlling the execution of instructions through the use of microprogramming and microinstructions, efforts are continuing in order to provide a more efficient system for executing instructions by conserving read only memory or steps in the execution of an instruction.

The Honeywell Series 60 — Level 64 which is currently in production, uses a similar technique as described herein but requires additional cycles and microwords. In cycle 1, a microword "FOC" forces a constant on the data bus and another microword "WIS" writes the constant into scratchpad memory. In cycle 2, a microword "RES" reads the constant in scratchpad memory into the data bus and another microword "LSM" loads the constant from the bus into the MB register (microprogram base).

In cycle 3, another microprogram "BUN" (branch unconditionally), adds the constant in the MB register to the address register to form a 4096 word segment of which the constant is the first word.

This technique took three machine cycles and required four microwords to perform the branch.

OBJECTS OF THE INVENTION

It is a primary object of the invention therefore to provide a means for ensuring maximum data handling capabilities at minimum cost.

It is another primary object of the invention to provide an improved ROM system.

It is still a further object of the invention to provide a ROM system that uses fewer machine cycles to perform a branch.

It is yet another object of the invention to perform a branch using fewer microwords thereby requiring less memory storage.

It is still a further object of the invention to provide apparatus responsive to a control field in a microword to select 1 of 16 ROM banks.

SUMMARY OF THE INVENTION

In accordance with the above and other objects of the invention, ROM space is conserved and throughput is increased by the use of the Load External Register (LER) microword. This technique allows microinstructions having as few as 8 bits for addressing to actually address any one of up to 16K words.

The LER microword has a 13 bit control field. Five bits of the 13 can address one of 32 registers and the remaining 8 bits store a constant which can be added to or replace the data in many of the registers.

If an LER microword which is stored in read-only memory (ROM) is addressed and read into the ROM Local Register (RSLR), and the 5 bit address field configuration selects the ROM register RSAR, then the 4 low order bits are transferred to the 4 high order bits of RSAR thereby selecting one of up to 16 ROM banks.

Therefore, in one cycle we read out one microword which loads a register with 4 bits to select the next ROM bank and in the second cycle we read the next microword into the ROM Local Register (RSLR) from the selected ROM bank.

BRIEF DESCRIPTION OF THE DRAWINGS

FIG. 2 is the detailed circuitry of the invention.

DESCRIPTION OF THE PREFERRED EMBODIMENT OF THE INVENTION

Figures 3A, 3B, 3C, 4:
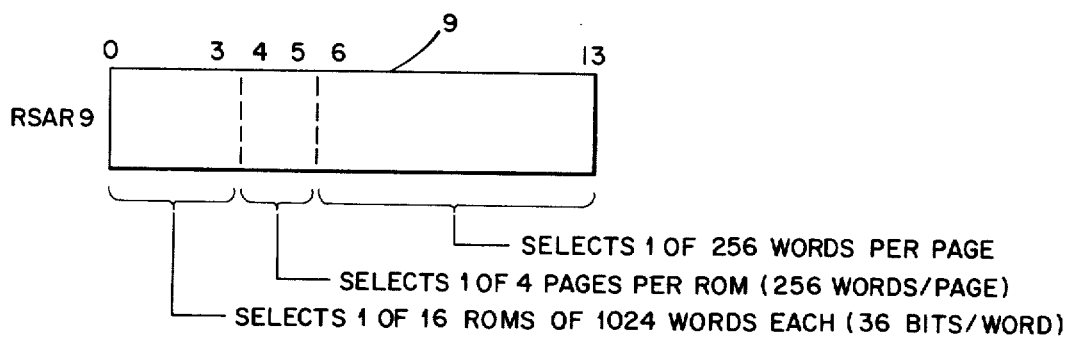
FIGS. 3a–3c show the format of the Load External Register (LER) microword and two other typical microword formats.
FIG. 4 shows the format of the ROM address register (RSAR).

This invention specifically relates to the LER Microword (Load External Register) in its control of the circuitry to perform the Branch Function. FIG. 3b shows the format of the LER Microword.

Microwords ULB, SBR and SPL have an address location of the next microword as typically shown by the ULB type microword of FIG. 3c labelled Branch Address 50.

Figure 1:
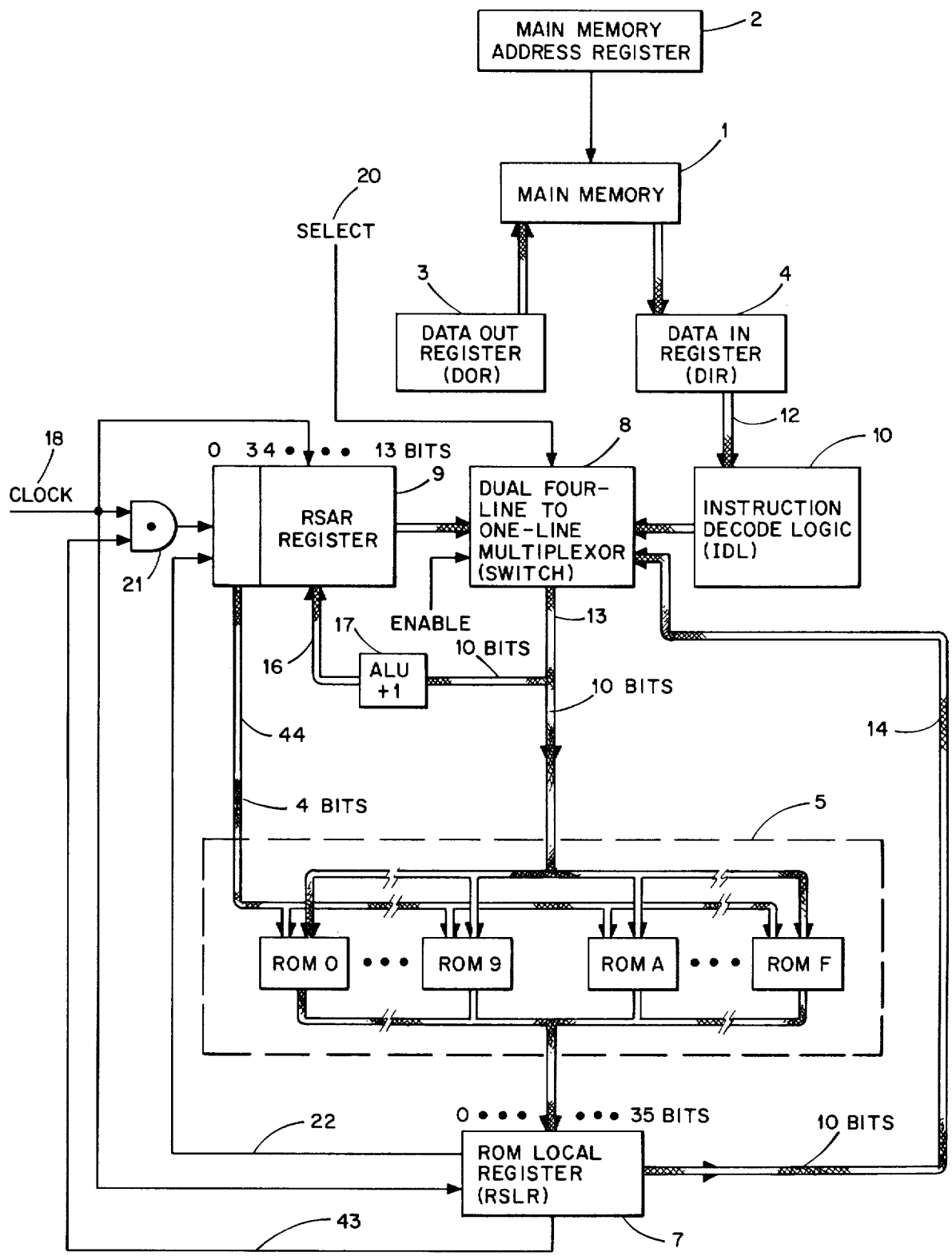
FIG. 1 is a block diagram of the pertinent parts of the Main Memory (MM) subsystem and a read only memory (ROM) system of invention.

Referring now to FIG. 1, there is shown a conventional solid state random access main memory 1 which stores instructions and data. Main memory address register 2 stores the address of the location in memory that receives information from data out register (DOR) 3, when the op-code of the instruction requests a write operation into main memory; it also stores the address of the location in main memory 1 that provides information to data in register (DIR) 4 when the op-code of the instruction calls for a read operation. (DIR) 4 stores signals representing an instruction to be executed under control of the microprogram control unit (portions of which are not shown). The instruction is decoded in instruction decode logic unit 10, and 10 bits representing a ROM address are selected by switch 8 providing the address of the ROM 5. Switch 8 is a dual 4 line to 1 line multiplexor of the Ser. No. 74153 type which is described on pages 9-351 through pages 9-364 of the Integrated Circuits Catalog for Design Engineers, published by Texas Instruments Inc. Microwords are stored in read only memory (ROM) 5 which is comprised of up to 16 banks of memory, ROM O through ROM F, each bank comprised of 1,024 words, each word comprising 36 bits plus 4 additional parity bits. (It should be noted that the ROM system is a typical memory system and other types of ROM's with different size words may also be utilized to practice the invention). Each microword in a single bank of ROM 5 is addressed by 10 bits of RSAR register 9. The first 4 bits (0-3) of RSAR register 9 select 1 of up to 16 banks of ROM 5 and the next 10 bits (4-13) of RSAR register 9 through ROM address switch 8 provides the address within a particular bank. A microword addressed by ROM address switch 8 is read into ROM local register (RSLR) 7. A microword in RSLR register 7 is made up of various control bits which are sent to different subsystems where specific control functions are performed depending upon the bit configurations. These control functions other than the LER microword whose format is shown in FIG. 3b are not described further in this application since they are not pertinent to the invention. However, to gather the flavor of the various type of control bits that perform various control functions that are read into RSLR register 7, FIGS. 3a-3c are provided. These formats are typical and there may be other 36 bit formats in a conventional microword in a ROM.

Concurrently, with the reading of the 10 bits of an instruction indicating the address of the first word in the ROM 5 of the microprogram to be executed, these 10 bits are also read into RSAR register 9 after it has been incremented in the arithmetic and logic unit (ALU) 17 by 1; thus, RSAR register 9 holds the address of the next microinstruction of the microprogram sequence to be executed. When the microinstruction is read into RSLR register 7 under control of ROM address switch 8, it will be executed by a microprogram control unit subsystem (not shown) unless it is a branch instruction similar to that of FIG. 3c, whereupon the last 10 bits of the branch instruction are transferred to ROM via path 14 and switch 8 and path 13. The last 10 bits represent the new branch address and accordingly the execution microprogram begins at the new address provided.

Additionally, the 10 branch bits representing the address of the first instruction in the microprogram to be executed are stored in RSAR register 9 after once again having been incremented by 1 in ALU 17. On successive cycles which typically occur every 200 nanoseconds, the RSAR register 9 sends 10 bits through switch 8 to ROM 5, and in the process, RSAR register 9 is incremented by 1 by ALU 17 over paths 13 and 16. Hence, it is seen that after the address of the first microinstruction is provided via ROM address switch 8, the address of succeeding microinstructions is provided via RSAR register 9 every 200 nanoseconds under control of clock 18 and thus the microprogram is executed until a microword in the executing microprogram causes a select signal 20 to connect another address through switch 8.

Line 43 is the gated output of RSLR register 7 and controls the clock 18 input into the RSAR register 9 through gate 21 when an LER microinstruction is stored in RSLR register 7. Line 22 is the data path of the 4 bit transfer from RSLR register 7 to RSAR register 9 which selects the 1 of up to 16 banks of ROM 5.

The minicomputer system utilizing the invention has 6 different types of microwords, the format of 3 typical ones being shown on FIGS. 3a-3c. The microword, their identification and function are listed in the Table I below.

Table I

| Code | Mnemonic | Function |
|------|----------|----------|
| 0 | BCL | Interface Control |
| 1 | ULB | Long Branch |
| 4 | LER | General Register Control |
| 5 | SBR | Short Conditional Branch |
| 6 | SPL | Splatter |
| 7 | GCN | Constant Generator |

Referring now to FIG. 2, ROM address switch 8 selects the address of a word in ROM O through ROM F of ROM 5. Assume an LER microword was stored in that address and was read out into the ROM Local Register RSLR 7. RSLR register 7 now stores a word having a format as shown in FIG. 3b. Register 53 comprised of flip-flops F/F00B-F/F02B stores a binary code of 100 which designates this as an LER microword. Register 51 comprised of flip-flops F/F23B-F/F27B stores a binary code of 00101 which designates F/F00A-F/F03A of RSAR register 9 as the flip-flops to be loaded with the 4 bit address in register 52 comprised of flip-flops F/F32B-F/F35B of RSLR register 7. When the LER microword shown in FIG. 3b is stored in RSLR register 7, then the output of AND gate 42 is set to a high or logical "1" when the binary code 00101 is set in F/F23B-F/F27B of register 51. Also, the 100 binary code designating that this is an LER microword is set in flip-flops F/F00B-F/F02B of register 53, thereby setting the 3 inputs of AND gate 41 to "1's". The fourth input which is the output of AND gate 42 was also set to a "1". This sets line 43 to a "1" which is one input to AND gate 40. Then at clock 18 time, the output of AND gate 40 goes high (i.e. to a logical "1"), setting the output of flip-flop F/F32B-F/F35B of register 52 into flip-flops F/F00A-F/F03A of RSAR register 9. This 4 bit binary code will select one of the 16 ROM 5 (ROM O-ROM F) banks. Those signals pass through cable 44. This cable terminates at each bank of ROM 5 with a 4 bit code which selects the particular bank of ROM 5. Each bank of ROM 5 (ROM O-ROM F) will be responsive to a mutually exclusive 4 bit code.

When a 10 bit address is selectd by ROM address switch 8, that address plus 1 is stored in flip-flops F/F04A-F/F13A of RSAR register 9 at clock 18 time. At the same time, the 10 bit address is clocked into RSAR register 9, (F/F04A-F/F13A), the output of flip-flops F/F32B-F/F35B in register 52 is clocked into flip-flops F/F00A-F/F03A. This selects the next microword at the newly selected ROM 5 and at the old 10 bit address plus 1.

Referring now to FIG. 3a, there is shown the format of the BLC (Bus Control) microword. In all cases, the microword following BCL is read out from the next address location. FIG. 3b shows the LER microword with bit positions 0-2 register 53 indicating that this is an LER microword, bit positions 23-27 register 51 indicating which register to be updated and in the example shown in register 51, 00101 designating the 4 high order bits of RSAR register 9 are to be updated, and the constant field register 52 having stored the data to be transferred to update the selected register. FIG. 3c shows the ULB (Unconditioned Branch) microword with its 10 bit branch address field 50. FIG. 4 shows the address controlled by the fields of RSAR register 9. Bits 0-3 select one of up to 16 ROM 5. In a typical system, each bank of ROM could store 1024 words each with 36 data bits plus 4 parity bits per word.

Bits 4-5 select 1 of 4 pages per bank of ROM 5, each page having 256 words per page.

Bits 6 through 13 select 1 of 256 words per page.

What is claimed is:

1. In a data processing system having a plurality of registers for storing electronic signals and a read only memory (ROM) system, said ROM system having at least one read only memory (ROM) having a plurality of banks of memory, each bank for storing a plurality of microprograms, each microprogram comprised of a plurality of microwords, each microword comprised of a plurality of bits, any of said microwords, stored in said ROM, being addressed by a predetermined number of bits stored in a ROM address register (RSAR) coupled to said ROM, said RSAR being one of said plurality of registers, said ROM system further comprised of a ROM local register (RSLR) also coupled to said ROM for storing any of said microwords read from said ROM during a current cycle, any of said microwords addressed by said predetermined number of bits stored in said RSAR during a previous cycle, an apparatus for increasing the capacity and speed of access of said ROM system comprising:

(a) first means, in said ROM system, for storing first coded signals for addressing any one of said plurality of registers;

(b) second means, in said first means, for storing second coded signals of a predetermined first constant indicating a predetermined one of said plurality of registers, said predetermined one of said plurality of registers being said RSAR;

(c) third means, in said first means, for storing third coded signals of a predetermined second constant indicating a predetermined one of said plurality of banks; and (d) fourth means, coupled to said RSLR and to said RSAR and to said third means for transferring said third coded signals to said RSAR during said current cycle, whereby said predetermined one of said plurality of banks can be selected for reading in a next cycle by executing a predetermined one of said microwords during said current cycle.

2. The apparatus as recited in claim 1 including fifth means in said first means, for storing fourth coded signals indicative of a predetermined third constant for identifying said first means.

3. The apparatus as recited in claim 2 including sixth means coupled to said fifth means, said sixth means being partially enabled when said fifth means stores coded signals indicative of said predetermined third constant.

4. The apparatus as recited in claim 3 including seventh means, coupled to said second means, said seventh means being enabled when said second means stores coded signals indicative of said predetermined first constant, whereby the enabling of said seventh means fully enables said sixth means, whereby said third coded signals are transferred to said RSAR.

5. The apparatus as recited in claim 3 wherein said sixth means comprises a first AND gate.

6. The apparatus as recited in claim 4 wherein said seventh means comprises a second AND gate.

7. The apparatus as recited in claim 4 including eighth means coupled to said ROM address register (RSAR) for incrementing the contents of said RSAR by one during said current cycle for use in addressing a next microword during said next cycle.

* * * * *